United States Patent
Sugai et al.

(10) Patent No.: US 8,224,251 B2
(45) Date of Patent: Jul. 17, 2012

(54) DATA COMMUNICATION APPARATUS AND CONTROL METHOD FOR PREVENTION OF AUDIO NOISE SIGNALS DUE TO TRANSMITTED DATA

(75) Inventors: Masanori Sugai, Aichi (JP); Junya Matsumoto, Shizuoka (JP)

(73) Assignee: Sony Corporation, Tokyo (JP)

( * ) Notice: Subject to any disclaimer, the term of this patent is extended or adjusted under 35 U.S.C. 154(b) by 454 days.

(21) Appl. No.: 12/582,759

(22) Filed: Oct. 21, 2009

(65) Prior Publication Data

US 2010/0099360 A1 Apr. 22, 2010

(30) Foreign Application Priority Data

Oct. 22, 2008 (JP) .................. P2008-271613

(51) Int. Cl.
*H04B 1/04* (2006.01)
*A61F 11/06* (2006.01)
(52) U.S. Cl. ............... 455/63.1; 381/71.1; 381/94.1
(58) Field of Classification Search ............ 455/63.1, 455/67.11, 569.1, 570; 381/71.1, 71.3, 71.8, 381/71.11, 71.14
See application file for complete search history.

(56) References Cited

U.S. PATENT DOCUMENTS

| 6,097,820 A * | 8/2000 | Turner ................ 381/94.3 |
| 6,496,686 B1 | 12/2002 | Charkani et al. |
| 6,953,980 B2 * | 10/2005 | Escoffier et al. ............ 257/499 |
| 7,856,252 B2 * | 12/2010 | Jacob ................ 455/570 |
| 8,064,611 B2 * | 11/2011 | Le Faucheur et al. ....... 381/71.1 |
| 8,064,866 B2 * | 11/2011 | Le Mellat .............. 455/312 |
| 2008/0090625 A1 * | 4/2008 | Josefsson et al. ......... 455/575.1 |
| 2010/0172527 A1 * | 7/2010 | Zhu et al. .............. 381/317 |

FOREIGN PATENT DOCUMENTS

| JP | 2002 521945 | 7/2002 |
| JP | 2007 43555 | 2/2007 |

* cited by examiner

*Primary Examiner* — Blane J Jackson
(74) *Attorney, Agent, or Firm* — Frommer Lawrence & Haug LLP; William S. Frommer

(57) ABSTRACT

A data communication apparatus includes a band-elimination filter configured to perform a process of reducing a specific frequency component included in transmission data, a packet producer configured to produce packet data including therein data outputted from the band-elimination filter, and an antenna configured to output the packet data produced by the packet producer, and further, the band-elimination filter is configured to reduce a frequency component corresponding to the reciprocal of a packet transmission cycle inherent in the packet data.

10 Claims, 12 Drawing Sheets

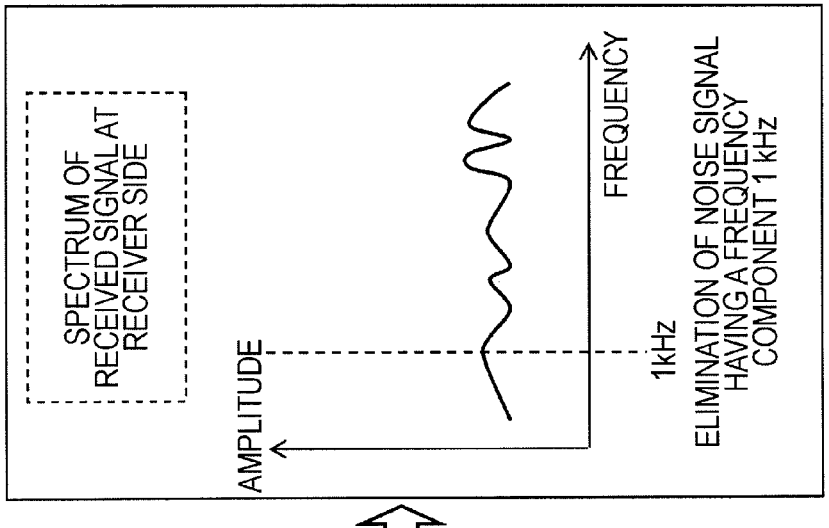
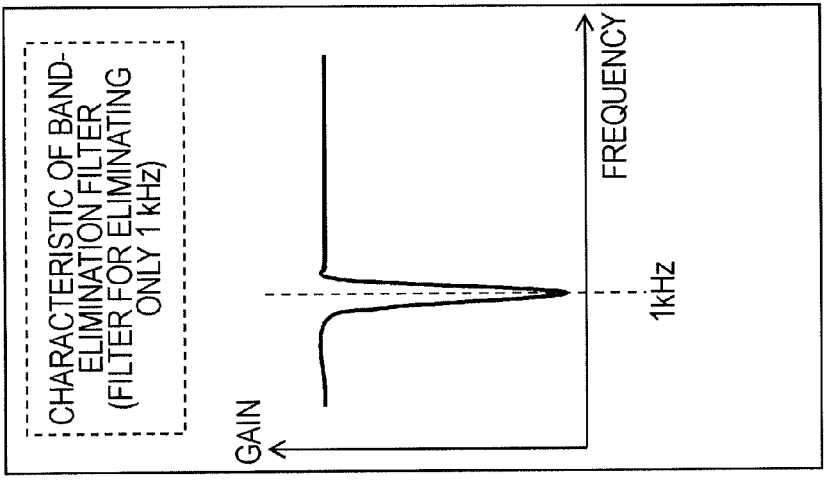
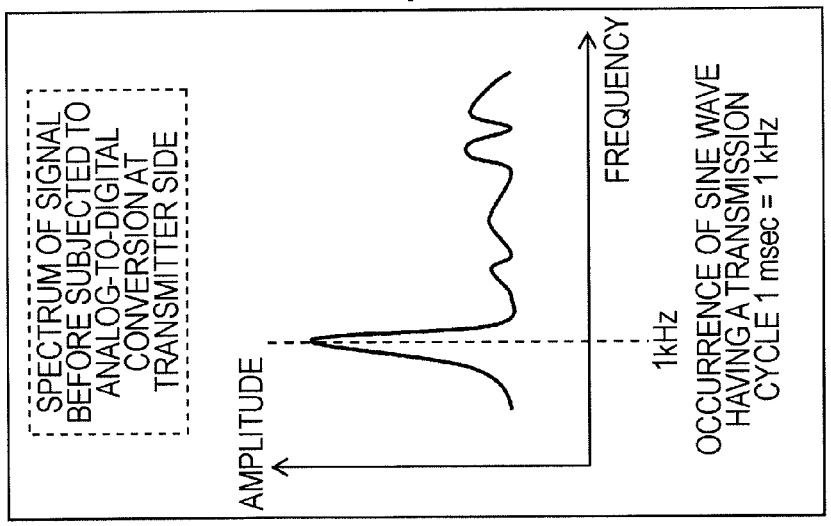

FIG. 12

| SETTING | COEFFICIENT SET |
|---|---|
| SETTING 1 | $a_{01}, a_{11}, a_{21}, b_{11}, b_{21}$ |
| SETTING 2 | $a_{02}, a_{12}, a_{22}, b_{12}, b_{22}$ |
| SETTING 3 | $a_{03}, a_{13}, a_{23}, b_{13}, b_{23}$ |
| SETTING 4 | $a_{04}, a_{14}, a_{24}, b_{14}, b_{24}$ |
| SETTING 5 | $a_{05}, a_{15}, a_{25}, b_{15}, b_{25}$ |
| ⋮ | ⋮ |

DATA COMMUNICATION APPARATUS AND CONTROL METHOD FOR PREVENTION OF AUDIO NOISE SIGNALS DUE TO TRANSMITTED DATA

BACKGROUND OF THE INVENTION

1. Field of the Invention

The present invention relates to a data communication apparatus and a communication data control method. More particularly, it relates to, for example, a data communication apparatus and a communication data control method in which voice information obtained through a wireless microphone or the like is transmitted by means of wireless communication.

2. Description of the Related Art

To date, wireless-microphone systems have been used as voice collection and amplification systems. Among these wireless-microphone systems, there are types of wireless-microphone systems each of which includes a voice collecting microphone configured to be separate from a transmitter, and allows various types of microphones to be attached to the transmitter in accordance with a user's demands. With respect to the microphones, there are various types, such as a compact microphone, which is hardly visible even while being used, and a highly directional microphone, which is used for collecting voices coming from far away. More specifically, for example, a compact microphone which can be attached to a user's clothing, i.e., a lavalier microphone, or a bar-shaped microphone which has a sharp directional characteristic, i.e., a shotgun microphone, can be used. Among these types of microphones, there are types of microphones each incorporating therein an amplifier for amplifying voice signals using an element, for example, an active element such as an FET or a transistor.

In FIG. 1, an example of a configuration of a communication system constituted by a microphone 10, a transmitter 20 and a receiver 30 is shown. The microphone 10 includes a vibration plate 11 configured to vibrate in accordance with acoustic waves originating from users' voices and the like, and an FET 12 configured to amplify electric signals generated on the basis of the vibrations, and, outputs signals amplified by the FET 12 to the transmitter 20. The microphone 10 is supplied with electric power through, for example, the transmitter 20.

Voice signals outputted from the microphone 10 are inputted to the transmitter 20. The transmitter 20 performs processes of analog-to-digital conversion, digital modulation, high-frequency amplification and the like, and thereby, produces transmission signals to be transmitted to the receiver 30. The transmission signals are transmitted to the receiver 30 via an antenna 21 by means of wireless communication.

The receiver 30 receives communication data from the transmitter 20 via an antenna 31, further, performs a process of demodulating in order to extract the voice signals from received signals, and then, outputs the resultant signals to, for example, a speaker, a recording device or the like, which are not illustrated in FIG. 1. For example, the demodulated voice signals are outputted through the speaker, or alternatively, are subjected to processing for recording thereof into a recording medium in the recording device.

A configuration of the transmitter 20 and processes performed by the transmitter 20 in a system in which the transmitter 20 performs wireless transmission subsequent to digital modulation in such a manner as described above will be hereinafter described with reference to FIG. 2. FIG. 2 is an example of a configuration of the transmitter 20 configured to produce transmission data from electric signals inputted thereto, which are generated on the basis of the voice signals collected by the microphone 10. The transmitter 20 includes an amplifier 25, an analog-to-digital convertor 26, a packet producer 27, a digital modulator 28, a high-frequency amplifier 29 and an antenna 21.

Electric signals generated on the basis of voice signals collected by the microphone 10 are amplified by the amplifier 25 included in the transmitter 20, and subsequently, are converted to digital data by the analog-to-digital converter 26. The packet producer 27 produces packet data including this digital data. In the packet data, pieces of synchronization data, which are used for data synchronization, are provided.

Transmitting packet data has packets each including a piece of synchronization data and a block of voice data. An example of a configuration of the transmitting packet data is shown in FIG. 3. As shown in FIG. 3, the transmitting packet data forms a pattern of data in which packets each including a piece of synchronization data 51 and a block of voice data 52 are repeatedly arranged.

The digital modulator 28 performs a process of digital modulation with respect to the packet data, and subsequently, the high-frequency amplifier 29 superimposes packet data resulting from performing the process of digital modulation on a carrier signal functioning as a carrier wave of high frequency, further, performs a process of high-frequency amplification with respect to the resultant signals, and then, outputs the transmission signals generated thereby via the antenna 21.

In this manner, the transmitter 20 performs processes of modulation, high-frequency amplification and the like with respect to signals inputted from the microphone, and then, radiates wireless transmission signals. However, for example, a user uses the microphone 10 and the transmitter 20 under the condition that they are attached to the user's body. In this case, as a result, the microphone 10 and the antenna 21, which is configured to transmit data outputted from the transmitter 20, are located close to each other.

In such a case that the microphone 10 and the transmitter 20 are located close to each other, an active element, such as the FET 12 or the like, is likely to detect radio waves radiating from the antenna 21 of the transmitter 20. The detected signals are added to voice signals as noise signals which are different from the voices targeted for collection such as speech voices originating from a user, and as a result, are transmitted to a data converting section of the transmitter 20.

The transmitter 20 produces packets including the blocks of voice data 52 resulting from conversion of input signals from the microphone 10 as they are, that is, input signals, which include the voice signals to which the noise signals are added, as they are. Theses packets including the noise signals therein are transmitted to the receiver 30 as radio communication signals.

The receiver 30 receives transmission data from the transmitter 20, further, performs demodulation of voice data, and thereby, extracts voice signals. The extracted data is made up of voice signals including noise signals. Reproduction of voice signals in accordance with processes performed by the receiver 30 results in reproduction of voice signals to which noise signals are added, and further, depending on the utilization purpose of the system, the quality of the reproduced signals is likely to be unacceptable with respective to the desired quality of reproduction.

Components of the noise signals are associated with transmission cycles inherent in a string of data to be transmitted. In the case where pieces of data each having the same pattern are transmitted at intervals of a constant period, the pieces of data are reproduced as a sine wave having a frequency which is the reciprocal of the constant period, and in the case where a string of data having a random pattern with no transmission cycle is transmitted, the string of data is reproduced as a noise signal having random characteristics.

In the case of packet data shown in FIG. 3, that is, in the case of a string of data including pieces of synchronization data 51, each being of a fixed pattern for data synchronization and being added to a block of voice data, the repeatedly transmitted pieces of synchronization data 51 have a constant transmission cycle (T). Further, since the blocks of voice data 52 included in the packet data are data having random characteristics, noise signals reproduced at the receiver 30 side result in noise signals including two kinds of noise signals combined therein, one being a sine wave having a frequency (f[Hz]), which is the reciprocal of a packet transmission cycle (T [sec]) as represented by the following expression: f=1/T, the other one being a noise signal having random characteristics.

A voice transmission system employing a digital modulation scheme has a disadvantage in that it is difficult for a microphone to be prevented from picking up output signals radiating from the transmitter 20, and thus, to date, in order to overcome this disadvantage, various measures have been considered.

For example, in order to shield an amplifier inside a microphone from external radio waves, a configuration, in which parts such as radio wave intrusion preventing parts are added, has been proposed. Such an addition of parts to the microphone enables prevention of intrusion of transmission signals from a transmitter into the inside of the microphone, and thus, enables prevention of transmission of voice signals including noise signals from the transmitter to a receiver. However, when a compact microphone is used, there are lots of cases where it is difficult to add the parts for shielding the microphone from external radio waves. Further, difficulty in adding parts to a microphone after commencement of its use leads to a disadvantage in that it is difficult to reduce noise signals in the case where existing microphones are used.

Furthermore, several proposals associated with a signal processing configuration for preventing the above-described intrusion of noise signals have been suggested. For example, in PCT Japanese Translation Patent Publication No. 2002-521945, a configuration, in which voice signals inputted to a transmitter are divided into a plural of frequency bands by using an FFT, and amplitude levels of signals within a frequency band including a frequency corresponding to an interference are suppressed by using a comb-type filter, is disclosed.

However, such a configuration, in which an FFT and a comb-type filter are provided, increases a processing time, and as a result, leads to a disadvantage in that a large amount of transmission delay time (more than several seconds) occurs in transmission of the voice signals. Such a transmission delay time may be acceptable, for example, in mobile wireless communication systems such as mobile telephone systems, however, it is difficult to adopt such a configuration in systems in which a large amount of transmission delay time of voice signals is not acceptable, such as wireless microphone systems.

Furthermore the configuration, in which the FET and the comb-type filter are provided, results in suppression of amplitude levels of signals having frequency components within the whole frequency band including a frequency corresponding to the interference, and thus, has a disadvantage in that the clarity of transmitted voice signals is reduced. Moreover, the configuration, in which the FET and the comb-type filter are provided, leads to an increase of load on a processor for performing signal processes, and it is difficult to avoid an increase in device cost.

Further, in Japanese Unexamined Patent Application Publication No. 2007-43555, a configuration, in which stubs for eliminating signals of high-frequency components are utilized, has been disclosed. This configuration enables elimination of signals having very high-frequency components, but has a disadvantage in that it is difficult to eliminate signals of frequency components within a low-frequency band, such as a voice-frequency band.

SUMMARY OF THE INVENTION

It is desirable to provide a data communication apparatus and a communication data control method which enable prevention of occurrence of noise signals due to data being transmitted from a transmitter, and thereby, enable transference of high-quality data.

A first embodiment of the present invention is a data communication apparatus which includes a band-elimination filter configured to perform a process of reducing a specific frequency component included in transmission data, a packet producer configured to produce packet data including therein data outputted from the band-elimination filter, and an antenna configured to output the packet data produced by the packet producer, wherein the band-elimination filter is a filter configured to reduce a frequency component corresponding to the reciprocal of a packet transmission cycle inherent in the packet data.

Further, in a data communication apparatus according to the first embodiment of the present invention, preferably, the packet producer is configured to produce packet data which includes data outputted from the band-elimination filter and pieces of synchronization data which are allocated at intervals of a constant period in the data outputted from the band-elimination filter, and the band-elimination filter is a filter configured to reduce a frequency component corresponding to the reciprocal of a transmission cycle of the packet data, which is determined by the constant period provided between any two successive pieces of synchronization data.

Further, in a data communication apparatus according to the first embodiment of the present invention, preferably, the transmission data is data resulting from analog-to-digital conversion of voice data inputted from a microphone, and the band-elimination filter is a filter configured to reduce a frequency component corresponding to the reciprocal of a packet transmission cycle inherent in packet data having data resulting from analog-to-digital converting of the voice data and pieces of synchronization data.

Further, in a data communication apparatus according to the first embodiment of the present invention, preferably, the packet producer is configured to produce packet data so that the packet data has a plurality of packet different transmission cycles, and the band-elimination filter is configured so as to make it possible to reduce a plurality of frequency components corresponding to the reciprocals of the plurality of different packet transmission cycles of the packet data produced by the packet producer, respectively.

Further, in a data communication apparatus according to the first embodiment of the present invention, preferably, the band-elimination filter is configured so as to make it possible to reduce the plurality of different frequency components by setting different coefficients thereof.

Further, in a data communication apparatus according to the first embodiment of the present invention, preferably, the data communication apparatus further includes a memory configured to store a coefficient table therein which includes sets of different coefficients to be set to the band-elimination filter, and a coefficient switching controller configured to, in accordance with a transmission cycle of packet data produced by the packet producer, select a coefficient set from the coefficient table, which is appropriate for reduction of a frequency component corresponding to the reciprocal of a transmission cycle of the packet data, and thereby, change a characteristic of the band-elimination filter to an appropriate characteristic.

Further, in a data communication apparatus according to the first embodiment of the present invention, preferably, the band-elimination filter is configured to be an infinite impulse response (IIR) filter.

Further, in a data communication apparatus according to the first embodiment of the present invention, preferably, the packet producer and the band-elimination filter are configured to be supplied with a clock signal from the same clock supplier, and perform processes in accordance with processing timings determined on the basis of the clock signal, respectively.

Further, in a data communication apparatus according to the first embodiment of the present invention, preferably, the data communication apparatus includes a digital modulator configured to perform a process of digital modulation of the packet data produced by the packet producer, and a high-frequency amplifier configured to superimpose data outputted from the digital modulator on a carrier wave, and output the resultant signal via the antenna.

A second embodiment of the present invention is a communication data control method for performing control of transmission data in a digital communication apparatus and the communication data control method includes the steps of band-elimination filtering in which a band-elimination filter performs a process of reducing a specific frequency component included in transmission data, packet production in which a packet producer produces packet data including data outputted from the band-elimination filter, and data outputting in which the packet data produced by the packet producer is outputted via an antenna, and further, in the band-elimination filtering, a filtering process is performed so that the a frequency component corresponding to the reciprocal of a packet transmission cycle inherent in the packet data is reduced.

Further other ideas, characteristics and advantages of the present invention will be apparent from explanations which will be hereinafter made in further detail with reference to application examples and accompanying drawings. Additionally, an object referred to as a system in this patent specification denotes a logical aggregate of a plurality of elemental apparatuses, and all of the elemental apparatuses are not included in the same frame.

According to a configuration of an application example of embodiments of the present invention, in a data communication apparatus configured to produce and transmit packet data in which blocks of voice data obtained by, for example, a microphone, and pieces of synchronization data are alternatively allocated, a band-elimination filter is provided that allows reduction of a frequency component corresponding to the reciprocal of a packet transmission cycle determined by intervals of a constant period at which the pieces of synchronization data, each including a specific pattern of data, are allocated in the packet data. Providing this band-elimination filter allows selective elimination of a frequency component corresponding to the reciprocal of a packet transmission cycle inherent in the packet data, that is, the frequency component corresponding to a noise component caused due to wave-detection of transmission data from the microphone. This configuration enables reduction of a noise signal included in data transmitted from a transmitter, and thus, realization of high-quality data communication.

BRIEF DESCRIPTION OF THE DRAWINGS

FIG. 8 is a diagram illustrating an ideal frequency characteristic of a band-elimination filter included in a data communication apparatus according to embodiments of the present invention;

FIG. 12 is a diagram illustrating an example of a configuration of a coefficient table in which sets of coefficients (parameters) corresponding to individual settings are stored in advance.

DESCRIPTION OF THE PREFERRED EMBODIMENTS

Figure 1:
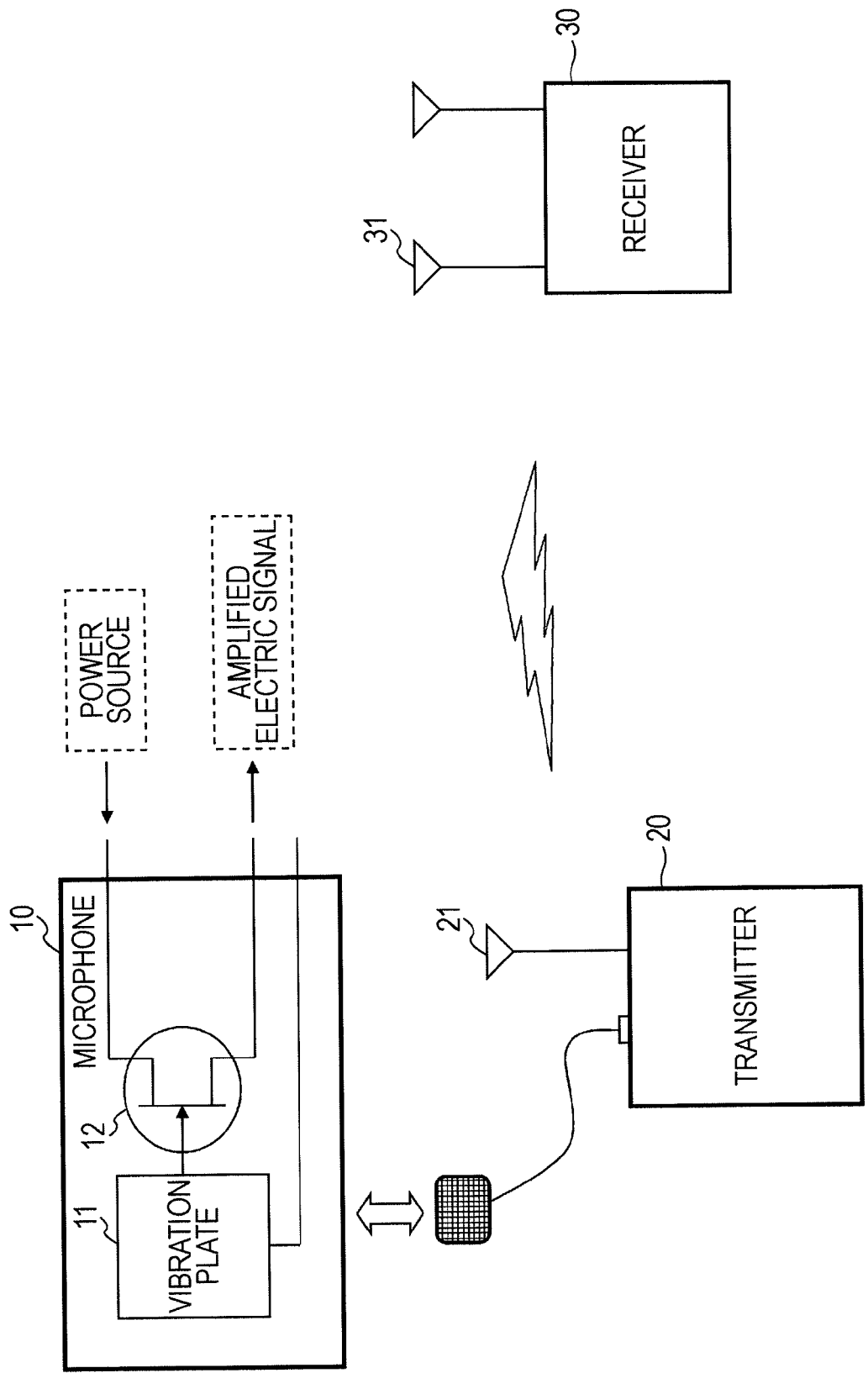
FIG. 1 is a diagram illustrating an example of a configuration of a data communication system including a microphone, a transmitter and a receiver.
Figure 2:
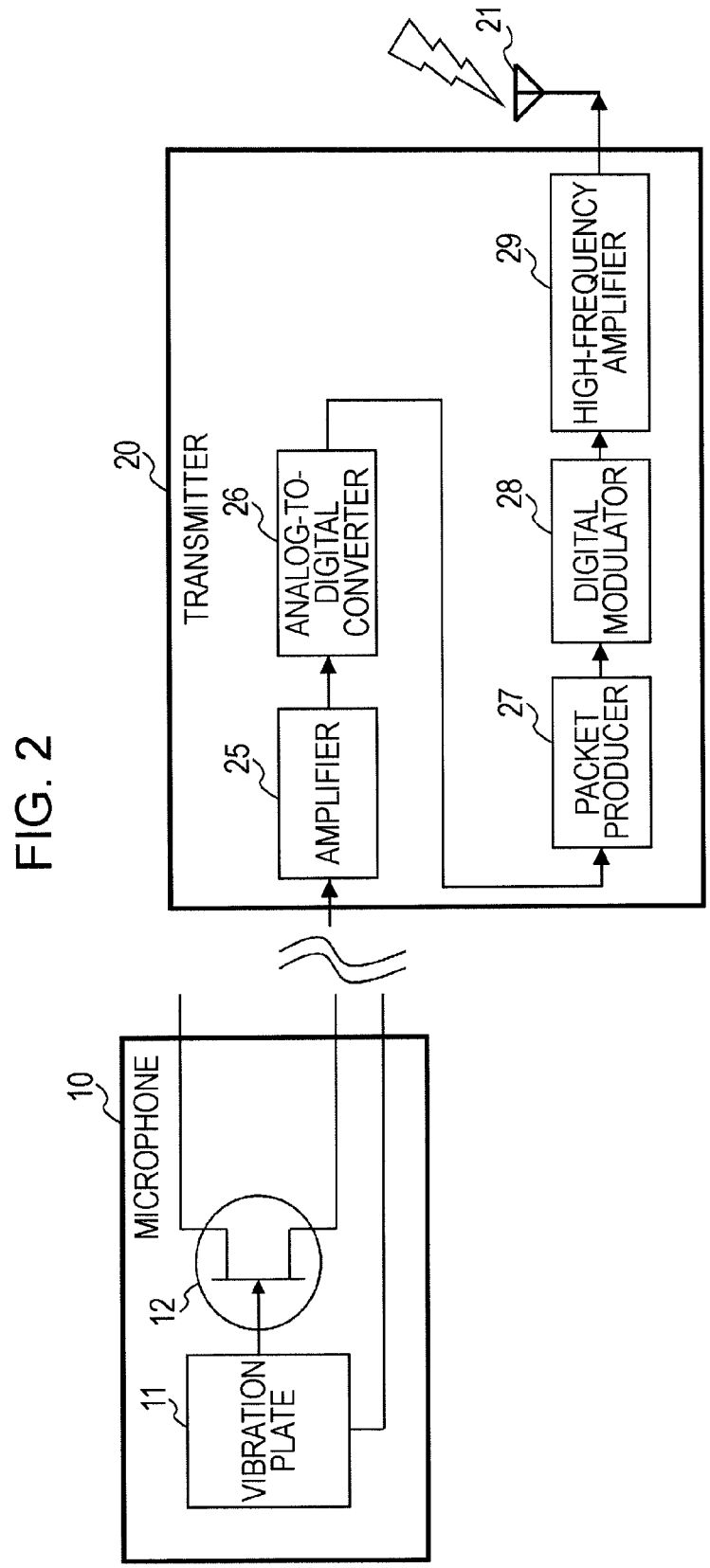
FIG. 2 is a diagram illustrating an example of a configuration and processes of a transmitter included in a system configured to perform digital modulation and wireless transmission.
Figure 3:
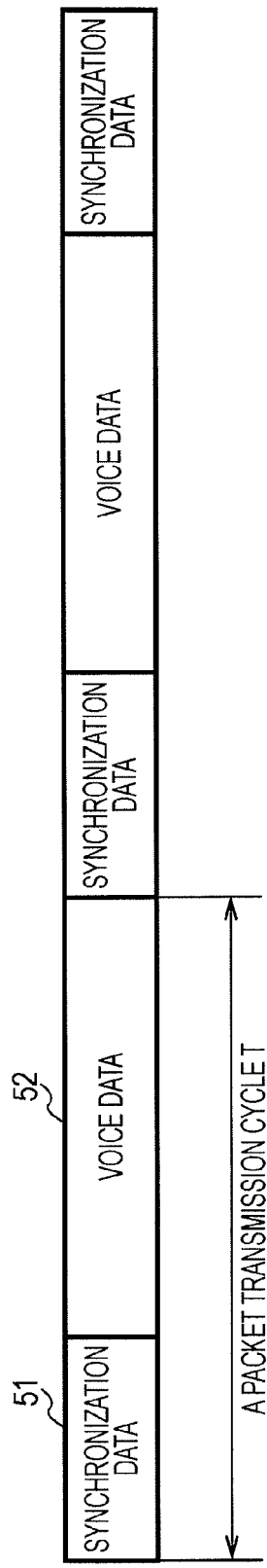
FIG. 3 is a diagram illustrating an example of a configuration of packet data produced by a transmitter included in a system configured to perform digital modulation and wireless transmission.
Figure 4:
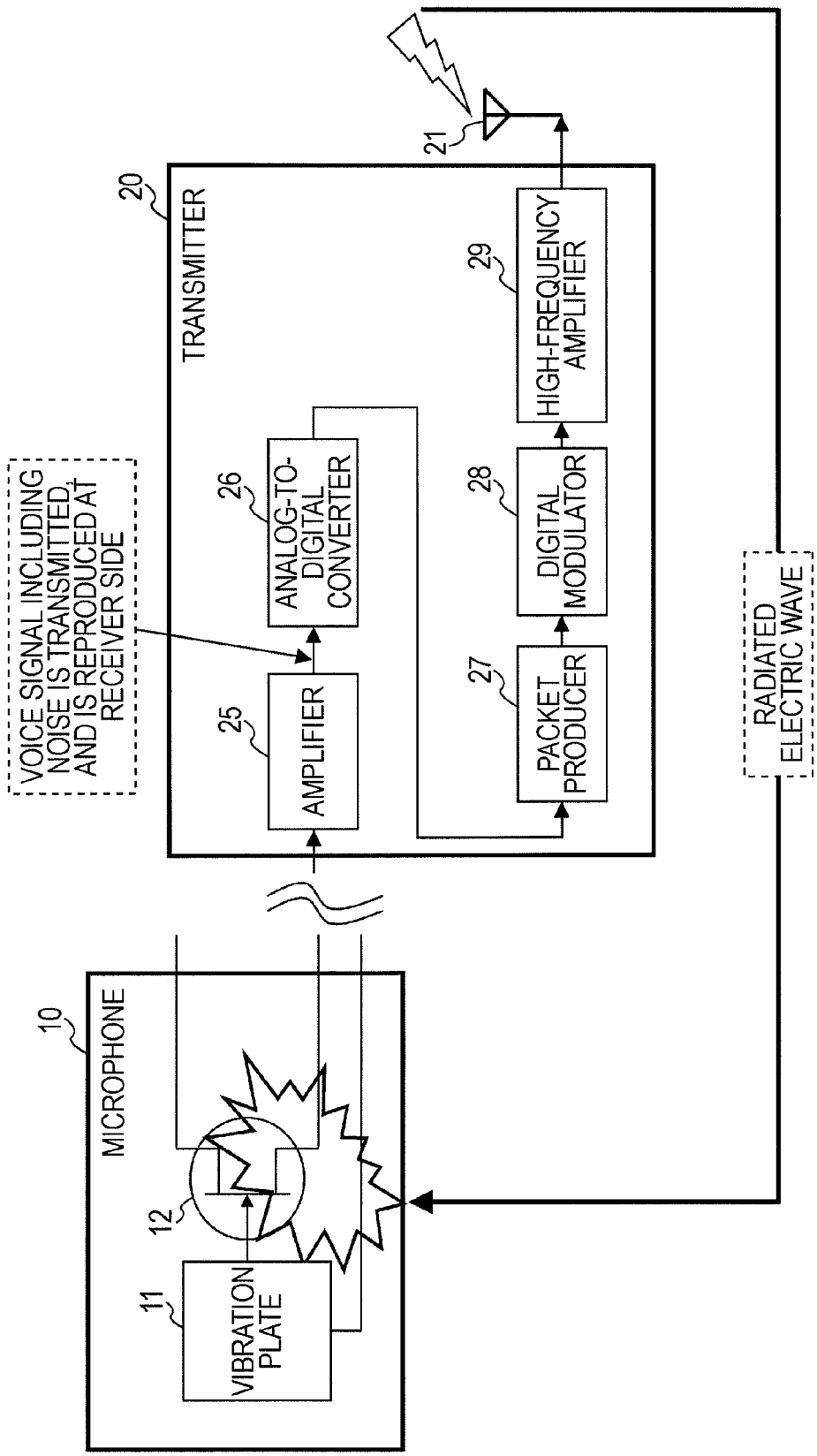
FIG. 4 is a diagram illustrating a problem in the case where electric waves radiating from an antenna of a transmitter are wave-detected by an active element such as an FET incorporated in a microphone.

Hereinafter, details of a data communication apparatus and a communication data control method according to embodiments of the present invention will be described with reference to drawings. Description will be made with respect to the following items.

(1) An outline of a data communication system
(2) A first application example of a data communication apparatus
(3) A specific example of a band-pass filter
(4) Robustness against variation of a clock frequency
(5) A second application example of a data communication apparatus (1) An Outline of a Data Communication System Firstly, an outline of a data communication system to which the present invention can be applied will be described.

A data communication apparatus according to embodiments of the present invention is an apparatus configured to transmit data by means of wireless communication. For example, a data communication apparatus (transmitter) 200 shown in FIG. 5 corresponds to the data communication apparatus according to embodiments of the invention.

Figure 5:
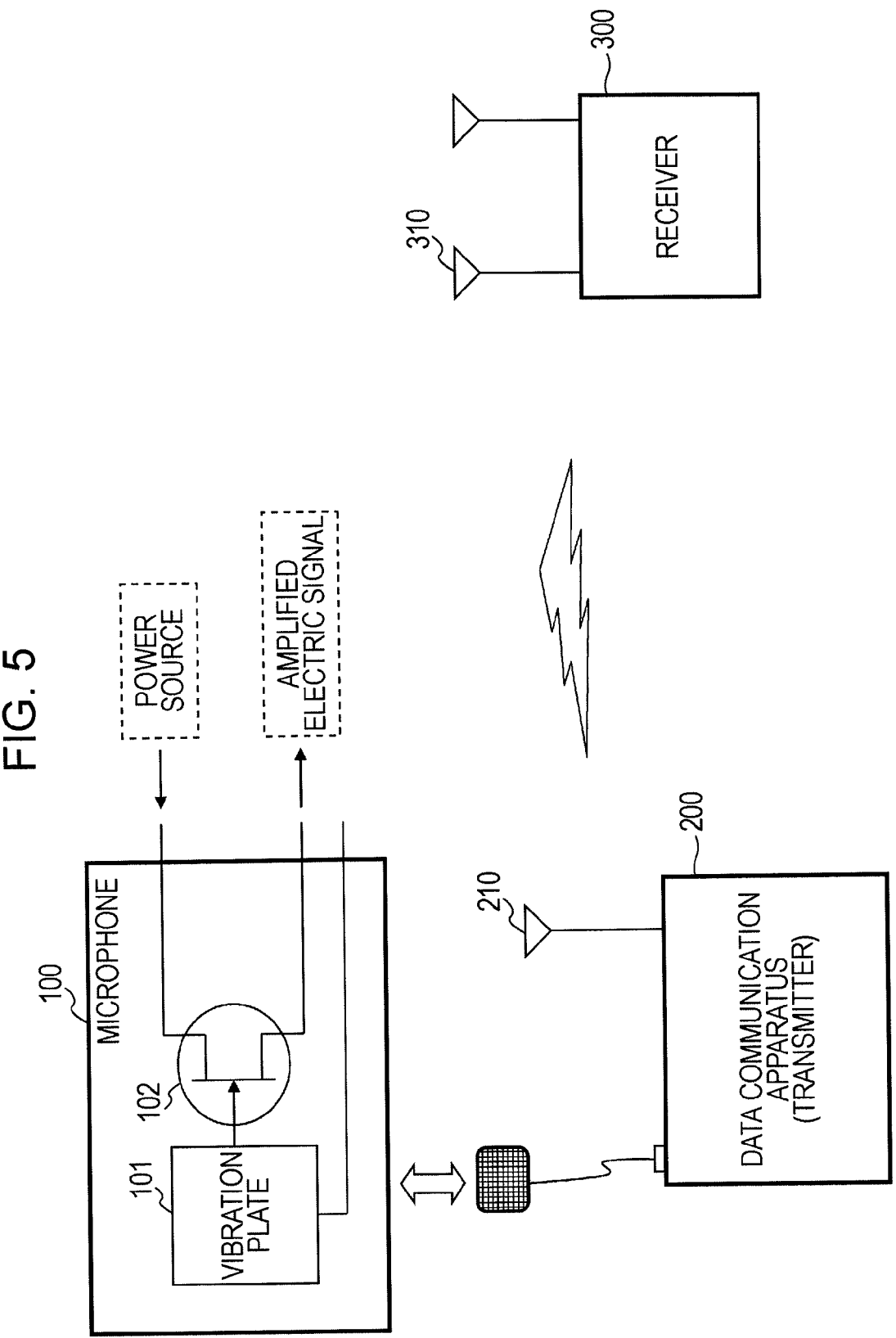
FIG. 5 is a diagram illustrating an outline of a data communication system to which embodiments of the present invention can be applied.

The data communication apparatus (transmitter) 200 shown in FIG. 5 executes prescribed processes with respect to inputted voice signals obtained by a microphone 100, further, produces transmission data, and then, transmits the transmission data produced thereby to a receiver 300 via an antenna 210. The receiver 300 receives the transmission data from the data communication apparatus (transmitter) 200 via an antenna 310, further, extracts the voice signals, and then, outputs the extracted voice signals to a speaker or a recording device.

The microphone 100, which includes a vibration plate configured to vibrate in accordance with acoustic waves, such as voice waves originating from users, and an FET 102 configured to amplify electric signals generated on the basis of the vibration, outputs signals amplified by the FET 102 to the transmitter 200. The microphone 100 is supplied with electric power through the transmitter 200.

In the same manner as or in a manner similar to the transmitter described above with reference to FIGS. 1 to 4, the data communication apparatus (transmitter) 200 shown in FIG. 5 receives signals outputted from the microphone 100, further, performs processes of analog-to-digital conversion, high-frequency amplification and the like with respect to the inputted signals, and thereby, generates transmission signals to be transmitted to the receiver 300.

However, as described above, electric waves radiating from the antenna 210 of the data communication apparatus (transmitter) 200 are likely to be wave-detected by active elements, such as the FET 102, incorporated in the microphone 100. In this case, detected signals are added to voice signals as noise signals. Further, provided that the configuration of the data communication apparatus (transmitter) 200 is the same as that of the existing transmitter 20 described above, the data communication apparatus (transmitter) 200 produces packets including the noise signal therein and outputs the resultant signals to the receiver 300.

The data communication apparatus (transmitter) 200 according to embodiments of the present invention is configured to prevent transmission of the voice data including the noise signal. Hereinafter, an example of a configuration of a data communication apparatus (transmitter) according to embodiments of the present invention will be described.

(2) A First Application Example of a Data Communication Apparatus

Figure 6:
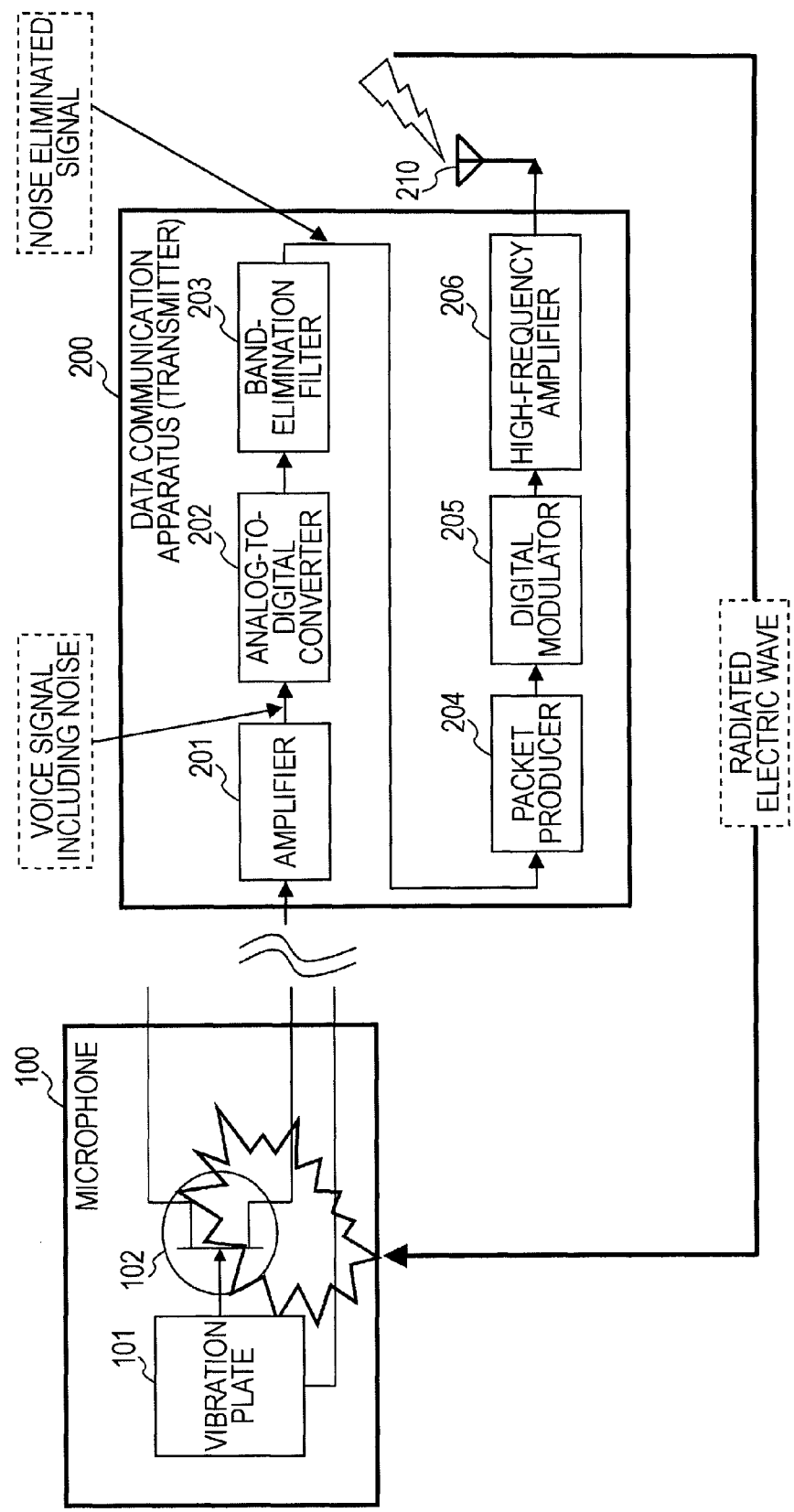
FIG. 6 is a diagram illustrating a configuration of a first application example of a data communication apparatus according to embodiments of the present invention.

Firstly, a first application example of a data communication apparatus according to embodiments of the present invention will be described with reference to FIG. 6 and drawings subsequent thereto. FIG. 6 shows an example of a configuration of the transmitter 200 which generates transmission data from inputted electric signals generated on the basis of voice signals collected by the microphone 100. The transmitter 200 includes an amplifier 201, an analog-to-digital converter 202, a band-elimination filter 203, a packet producer 204, a digital modulator 205, a high-frequency amplifier 206, and an antenna 210. This configuration is different from that of the existing application example which was described above with reference to FIG. 2 in that, in this configuration, the band-elimination filter 203 is included in the transmitter 200.

Electric signals, which are generated on the basis of voice signals collected by the microphone 100, are amplified by the amplifier 201 of the data communication apparatus (transmitter) 200, and subsequently, are converted to digital signals by the analog-to-digital convertor 202.

The digital signals generated by the analog-to-digital convertor 202 are inputted to the band-elimination filter 203. The band-elimination filter 203 is configured to include a band-elimination filter which causes frequency-components other than a frequency component to be eliminated to pass through, and further, causes the frequency component to be eliminated to be sufficiently attenuated, the frequency component to be eliminated being equal to the reciprocal of a transmission cycle of the packet data, that is, a transmission cycle of the synchronization data, produced by the data communication apparatus (transmitter) 200.

Figure 7:
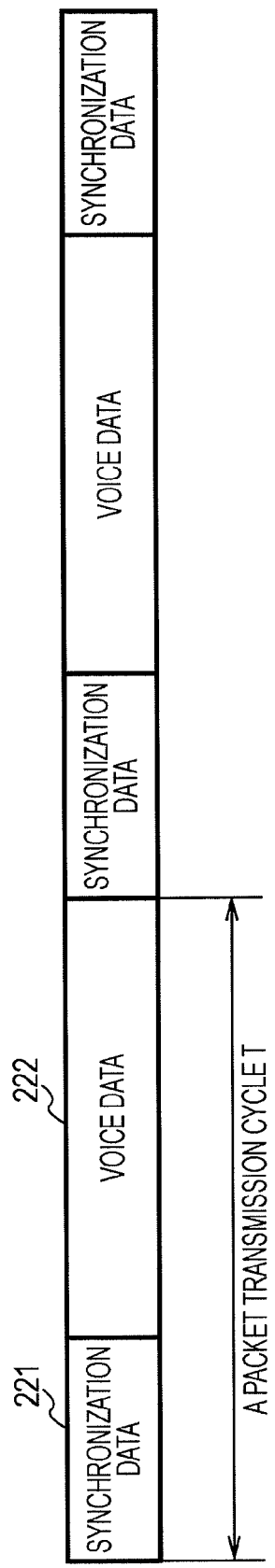
FIG. 7 is a diagram illustrating an example of a configuration of packet data produced by a data communication apparatus according to embodiments of the present invention.

A string of packet data produced by the data communication apparatus (transmitter) 200 has a configuration the same as that described above with reference to FIG. 3. The configuration of the string of packet data produced by the data communication apparatus (transmitter) 200 will be described below with reference to FIG. 7. As shown in FIG. 7, the string of packet data has repeating patterns of data each including a piece of frame synchronization data 221 and a block of voice data 222.

The synchronization data 221 is a piece of data which enables extraction of the voice data at the receiver 300 side with certainty, and includes a specific fixed pattern which is not included in the block of voice data. In contrast, the block of voice data stored in the string of packet data is a block of data having random characteristics. This repeatedly transmitted data synchronization data 221 has a constant transmission cycle (T). That is, the string of packet data has a packet transmission cycle corresponding to a constant interval between any two successive pieces of synchronization data.

The band-elimination filter 203 is configured to include a band-elimination filter causing frequency-components other than a frequency component to be eliminated to pass through, and causing the frequency component to be eliminated to be sufficiently attenuated, the frequency component (f [Hz]) to be eliminated being equal to the reciprocal of the packet transmission cycle (T [sec]), that is, the transmission cycle of the synchronization data (T [sec]), as represented by the following expression: f=1/T [Hz].

In this manner, the band-elimination filter 203 is configured to include a filter which eliminates a frequency component corresponding to the reciprocal of a packet transmission cycle generated in accordance with an interval between any two successive pieces of synchronization data included in the string of packet data.

An ideal frequency characteristic of the band-elimination filter will be hereinafter described with reference to FIG. 8. In FIG. 8, the following are shown.

(a) A spectrum of signals before being subjected to analog-to-digital conversion at the transmission side.
(b) A characteristic of a band-elimination filter.
(c) A spectrum of received signals at the receiver side.

In addition, in FIG. 8, an example is given of the case where a transmission cycle (T) of packet data produced by the data communication apparatus (transmitter) 200 is 1 [msec], i.e., T=1 [msec].

In the case where a transmission cycle (T) of the packet data produced by the data communication apparatus (transmitter) 200 is 1 [msec], i.e., T=1 [msec], a sine wave of a frequency (f), which is the reciprocal of the packet transmission cycle (T [sec]), as represented by the following expression: f=1/T [Hz], occurs.

FIG. 8A shows a spectrum of voice signals including noise signals mixed therein, the spectrum corresponding to a spectrum of signals outputted from the amplifier 201, shown in FIG. 6, of the data communication apparatus (transmitter) 200.

The spectrum shown in FIG. 8A is a spectrum of signals resulting from mixing of noise signals with genuine voice signals, the noise signals being generated by the microphone 100 wave-detecting of signals outputted from the antenna 210 of the data communication apparatus (transmitter) 200 shown in FIG. 6. In this spectrum shown in FIG. 8A, a peak of frequency components distinctly arises around a frequency of 1 [kHz].

This frequency (1 [kHz]) is a frequency corresponding to the reciprocal of a transmission cycle (T) of packet data produced by the data communication apparatus (transmitter) 200 in the case where T=1 [msec]. That is, the frequency (1 [kHz]) is a noise component occurring due to transmission data being outputted, via the antenna 210, by the data communication apparatus (transmitter) 200.

The band-elimination filter 203 is provided as a filter configured to eliminate this noise component. More specifically, the band-elimination filter 203 has a characteristic such as that shown in FIG. 8B. In FIG. 8B, a graph, which has a horizontal axis indicating a frequency and a vertical axis indicating a gain, shows a characteristic of the band-elimination filter 203.

The band-elimination filter 203 is a filter configured to selectively eliminate a frequency component around a frequency component of the noise signal occurring due to transmission data being outputted, via the antenna 210, by the data communication apparatus (transmitter) 200. That is, the band-elimination filter 203 has a characteristic of eliminating a frequency component around the frequency (1 [kHz]) corresponding to the reciprocal of the transmission cycle (T=1 [msec]) of packet data produced by the packet producer 204 of the data communication apparatus (transmitter) 200. FIG. 8B shows a characteristic of a filter configured to eliminate a frequency component around the frequency (1 [kHz]).

In addition, provided that the band-elimination filter 203 is a filter which is configured so as to comply with such a characteristic to a sufficient degree and have a sufficient attenuance relative to an elimination frequency, there is no particular limitation in structure and configuration of the band-elimination filter 203.

In addition, as an example of the band-elimination filter 203, an infinite impulse response (IIR) filter enables significant reduction of a processing time thereof and thus a delay time of voices. Applying such a filter enables suppression of only a frequency component corresponding to the packet transmission cycle, and thus, leads to no reduction of the quality of voices. Further, simplicity of the configuration of the filter brings an advantage in that the increase of load on a processor of the apparatus due to addition of the filter can be suppressed. In addition, an example of a configuration of the IIR filter will be described below.

Causing voice signals including noise signals which have a spectrum shown in FIG. 8A to pass through the band-elimination filter 203 having a transmission characteristic shown in FIG. 8B enables elimination of the noise component, and as a result, generates signals having a spectrum shown in FIG. 8C. FIG. 8C shows a spectrum of received signals at the receiver side, which corresponds to a spectrum of voice signals included in transmission data being outputted, via the antenna 210, by the data communication apparatus (transmitter) 200.

Signals resulting from elimination of a frequency component corresponding to the reciprocal of the packet transmission cycle, which is performed by the band-elimination filter 203, shown in FIG. 6, of the data communication apparatus (transmitter) 200 are outputted to the packet producer 204. Subsequent processes are performed in the same manner as or in a manner similar to the processes which were hereinbefore described with reference to FIG. 2 and the like.

That is, the packet producer 204 produces packet data including digital data from which the noise component is eliminated. The packet producer produces a string of packet data in which pieces of synchronization data are repeatedly inserted into signals outputted from the band-elimination filter 203. Further, the digital modulator 205 performs a process of digital modulation with respect to the string of packet data, subsequently, the high-frequency amplifier 206 superimposes the digital-modulated packet data onto a carrier signal, which is a carrier wave having a frequency higher than that of the bit-rate of the packet data, further performs a process of high-frequency amplification with respect to the resultant signals to generate transmission signals, and then, outputs the transmission signals via the antenna 210.

In this manner, the data communication apparatus 200 according to embodiments of the present invention is configured to eliminate a noise signal by using the band-elimination filter 203. That is, even in the case where transmission data outputted from the data communication apparatus 200 is wave-detected by the microphone 100, elimination of a noise signal having a specific frequency component, which is generated by the wave-detection, that is, elimination of signals having a frequency component corresponding to the reciprocal of the packet transmission cycle, is performed. Such a process as described above allows the data communication apparatus 200 to be configured to provide the receiver with packet data including voice data from which the noise signal is eliminated. As a result, this configuration enables processes of extraction, reproduction and recording with respect to voice data of high quality including a small amount of noise components at the receiver 300 side.

(3) A Specific Example of a Band-Elimination Filter

As described above, for example, the band-elimination filter 203 included in the data communication apparatus 200 shown in FIG. 6 is provided as a filter configured to selectively eliminate a frequency component around a frequency component of a noise signal occurring due to transmission signals being outputted, via the antenna 210, by the data communication apparatus (transmitter) 200. That is, the band-elimination filter 203 has a characteristic which allows a frequency component around a frequency corresponding to the reciprocal of a transmission cycle of packet data produced by the data communication apparatus (transmitter) 200 to be eliminated.

An example of a configuration of the case where the band-elimination filter 203 is provided as an infinite impulse response (IIR) filter will be hereinafter described with reference to FIG. 9. It is possible to apply the infinite impulse response (IIR) filter, which is well known to those skill in art, to the band-elimination filter 203.

Figure 9:
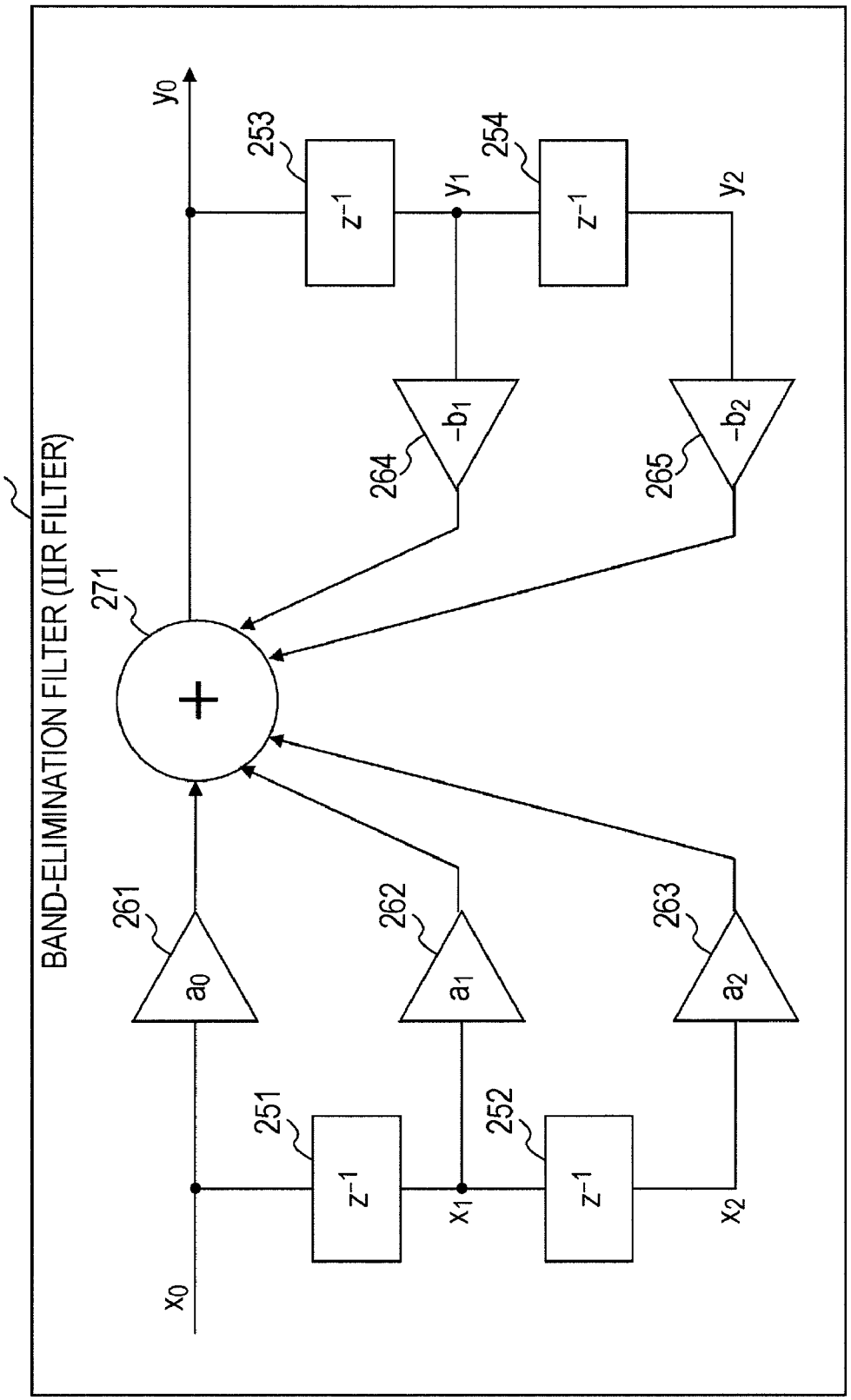
FIG. 9 is a diagram illustrating an example of a configuration of a band-elimination filter in the case where the band-elimination filter is configured as an infinite impulse response (IIR) filter.

A circuit shown in FIG. 9 is configured to include delay elements [$z^{-1}$] 251 to 254, which retain data inputted thereto during a period of time between two successive sampling timings, respectively, further, multiplication elements 261 to 265, which perform multiplication of data inputted thereto by filter-coefficients $a_0$, $a_1$, $b_0$ and $b_1$, and outputs the resultant data, respectively, and an arithmetic addition elements 271, which performs an arithmetic addition of data outputted from individual multiplication elements, and outputs the resultant data.

Here, an inputting piece of data and an outputted piece of data to/from the band-elimination filter (i.e., the IIR filter) are denoted by [$x_0$] and [$y_0$], respectively. Further, [$x_1$] and [$x_2$]

shown in FIG. 9 denote pieces of data prior to the inputting piece of data [$x_0$] by one sampling period and by two sampling periods, respectively. Furthermore, [$y_1$] and [$y_2$] denote pieces of data prior to the outputted piece of data [$y_0$] by one sampling period and by two sampling periods, respectively.

The outputted piece of data $y_0$ from the band-elimination filter shown in FIG. 9 is obtained in accordance with the following expression:

$$y_0 = a_0 x_0 + a_1 x_1 + a_2 x_2 - b_1 y_1 - b_2 y_2$$

In addition, in the case where the IIR filter shown in FIG. 9 is used, by adjusting the filter-coefficients $a_0$, $a_1$, $b_1$ and $b_2$, it is possible to configure a filter capable of eliminating only a desired frequency component. In the IIR filter shown in FIG. 9, a transmission delay time of voice data due to processes performed subsequent to inputting of voice data is a time taken to perform processes with respect to only several pieces of data, thus, enabling significant reduction of the transmission delay time caused during processes performed before outputting of the voice data, and further, enables reduction of discomfort and the like when a speaker speaks words, which is due to occurrence of the delay of voices under a circumstance where the speaker simultaneously hears its own voices, such as a circumstance where a wireless microphone is used.

Adjustment of the filter-coefficients $a_0$, $a_1$, $b_1$ and $b_2$ enables elimination of only a specific frequency component around the frequency component of a noise signal, corresponding to the reciprocal of a packet transmission cycle, and leads to no reduction of the quality of voices. Further, simplicity of the configuration of the filter enables suppression of the increase of load on a processor of the apparatus.

Additionally, in FIG. 9, the IIR filter is illustrated as a band-elimination filter, however, filters which are applicable to the band-elimination filter included in the data communication apparatus according to embodiments of the present invention are not limited to the IIR filter, and a filter having a configuration different from that of the IIR filter, such as an FIR filter, is applicable. Basically, filters each having a characteristic which enables selective elimination of a frequency component (f [Hz]) corresponding to the reciprocal of a packet transmission cycle (T [sec]), i.e., f=1/T, can be used.

(4) Robustness Against Variation of a Clock Frequency

Figure 10:
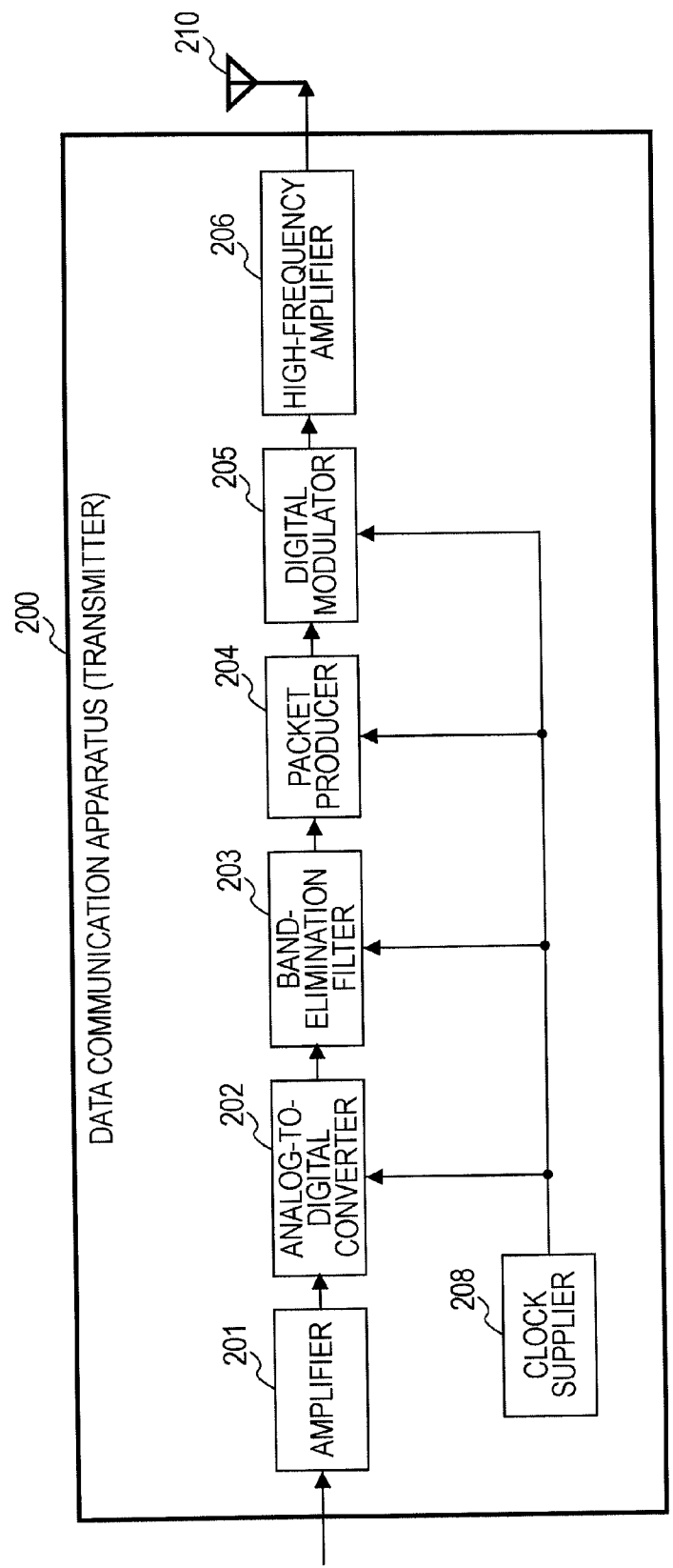
FIG. 10 is a diagram illustrating a configuration of clock supplying in a data communication apparatus according to embodiments of the present invention.

Individual sections included in the data communication apparatus 200 operate in synchronization with a clock signal supplied from a clock supplier provided inside the data communication apparatus. For example, as shown in FIG. 10, processing timings of the analog-to-digital converter 202, the band-elimination filter 203, the packet producer 204 and the digital modulator 205 are determined by a processing timing of the same clock signal supplied from a clock supplier 208, respectively.

For example, variation of a clock frequency is likely to occur due to environmental variation, such as temperature variation, however, processing timings of the analog-to-digital converter 202, the band-elimination filter 203, the packet producer 204 and the digital modulator 205 are determined by a processing timing of the same clock signal, respectively, and thus, all of processing timings of these sections result in being affected by the same variation of the clock signal.

For example, occurrence of the variation of a clock frequency leads to occurrence of the variation of a packet transmission cycle (T) of packets produced by the packet producer, the variation of the packet transmission cycle corresponding to the variation of the clock frequency. However, in conjunction with this variation of the clock frequency, variations of sampling timings of sampling targeted data in the band-elimination filter occur. For example, in the case of the IIR filter shown in FIG. 9, variations of the sampling timings of sampling targeted data $x_0$, $x_1$, $x_2$ and the like occur, respectively.

The variations of processing timings in the packet producer and the band-elimination filter occur on the basis of the same clock signal, and thus, are synchronized with each other. Therefore, even in the case where the packet transmission cycle varies to a certain degree, in conjunction with the variation, the characteristic of the band-elimination filter varies, and thus, the noise signal elimination effectiveness is not reduced but is maintained.

In this manner, even in the case where the timing of a clock signal varies due to variation of utilization environment, provision of a configuration which allows the packet producer and the band-elimination filter to be supplied with a clock signal from the same clock supplier in such a manner as described above leads to an advantage in that the reduction of a noise signal can be sufficiently achieved.

(5) A Second Application Example of a Data Communication Apparatus

There are cases where a transmission cycle of packet data outputted by the data communication apparatus is not fixed, and, for example, in accordance with changes of output channels, packet data having different transmission cycles are outputted. However, as described above with reference to FIG. 8, it is requested that the band-elimination filter is configured to have a characteristic which enables elimination of a frequency component (f [Hz]) corresponding to the reciprocal of the packet transmission cycle (T [sec]), i.e., T=1/T.

Therefore, in the case where the transmission cycle of packet data produced by the data communication apparatus is changed, it is requested to change the characteristic of the band-elimination filter. Hereinafter, an example of a configuration of the data communication apparatus capable of changing the characteristic of the band-elimination filter will be described.

Figure 11:
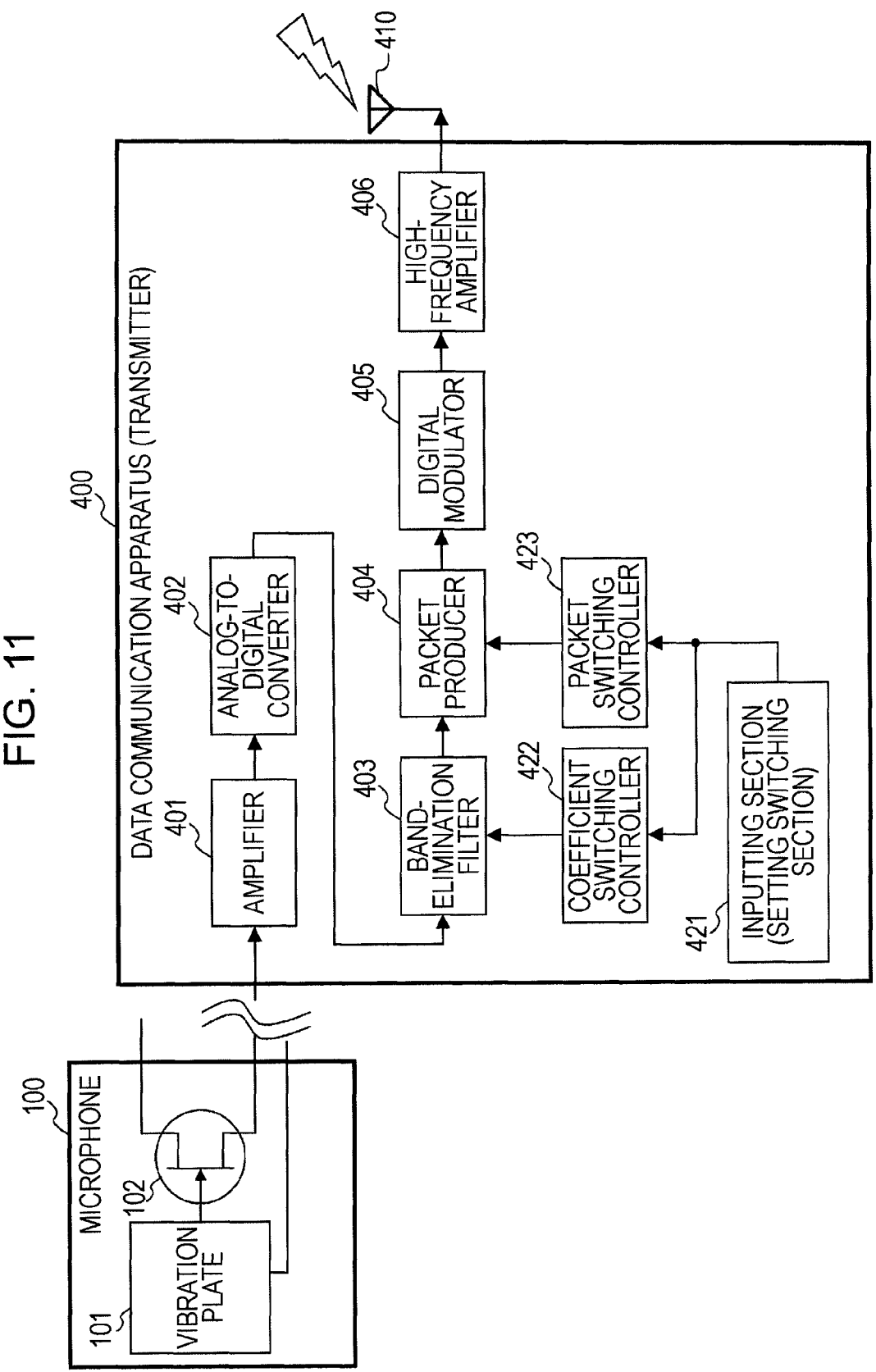
FIG. 11 is a diagram illustrating a configuration of a second application example of a data communication apparatus according to embodiments of the present invention.

A second application example of a data communication apparatus according to embodiments of the present invention will be hereinafter described with reference to FIG. 11. In FIG. 11, an example of a configuration of a transmitter 400 configured to generate transmission data from inputted electric signals based on voice signals collected by the microphone 100. The transmitter 400 includes an amplifier 401, an analog-to-digital converter 402, a band-elimination filter 403, a packet producer 404, a digital modulator 405, a high-frequency amplifier 406 and an antenna 410. The configuration of these elements is the same as or similar to that of the data communication apparatus given in the first example according to embodiments of the present invention, which was described above with reference to FIG. 6.

In addition to this configuration, the data communication apparatus 400 given in this example further includes an inputting section (a setting switching section) 421, a coefficient switching section 422 and a packet switching controller 423.

The inputting section (the setting switching section) 421 is an inputting section from which setting switching information associated with, for example, changes of outputting channels, packet data format and the like is inputted. Once the setting switching information is inputted from the inputting section (the setting switching section) 421, the packet switching controller 423 performs switching of configurations with respect to packet data in accordance with the inputted setting switching information.

More specifically, the packet switching controller 423 performs, for example, changing of the synchronization pattern set in packet data, and changing of a packet transmission cycle. The packet producer 404 produces packets of data on the basis of settings changed in accordance with control performed by the packet switching controller 423.

The setting switching information from the inputting section (the setting switching section) 421 is also inputted to the coefficient switching controller 422. The coefficient switching controller 422 determines coefficients of the band-elimination filter 403, which change the characteristic of the band-elimination filter 403, so as to eliminate a frequency component of a noise signal, which is determined by a packet transmission cycle, and then, changes coefficients included in the setting of the band-elimination filter 403 to the determined coefficients.

Additionally, the data communication apparatus may be configured to store, for example, a coefficient table, shown in FIG. 12, in memory thereof, which includes coefficient (parameter) sets corresponding to individual settings. A configuration may be provided that allows the coefficient switching controller 422 to acquire a coefficient set, which is appropriate for a setting to be set after switching, from the coefficient table shown in FIG. 12, and change the coefficients which are set in the band-elimination filter 403 to those included in the acquired coefficient set.

By providing such a configuration as described above, even in the case where a configuration of the packet data produced by the data communication apparatus 400 is changed and also a packet transmission cycle (T [sec]) is changed, in conjunction with the change, it is possible to change the characteristic of the band-elimination filter so as to eliminate the frequency component (1/T [Hz]). Consequently, even in the case where a configuration of the packet data is changed, it is possible to effectively eliminate a noise signal having a frequency component varied in accordance with the change of the configuration of the packet data, and thereby, achieve data communication of high quality.

In addition, coefficient sets shown in FIG. 12 show examples of coefficient sets corresponding to those of the IIR filter, which was described above with reference to FIG. 9. As described above, types of filters applicable to the band-elimination filter of the data communication apparatus according to embodiments of the invention are not limited to the IIR filter, but other types of filters each having a characteristic different from that of the IIR filter can be used. Therefore, it is necessary to make coefficient sets stored in the memory to be those corresponding to a type of the band-elimination filter provided in the data communication apparatus.

Hereinbefore, embodiments of the present invention have been described in detail with reference to specific application examples. However, it is apparent that parties concerned can make corrections or substitutions of the application examples within the scope not departing from the gist of the present invention. That is, the present invention has been disclosed by way of examples, however, it should not be interpreted that the present invention is limited to the examples. In order to judge the gist of the present invention, claims attached hereto should be referred to.

In addition, it is possible to cause a series of processes described in this patent specification to be executed by hardware, software, or a configuration in which hardware and software are combined. In the case where processing is performed by software, it is possible to install programs, in which process sequences are recorded, into memory inside a computer incorporated in a dedicated hardware, and cause the computer to execute the programs, or install the programs into a general-use computer capable of executing various processes, and cause the computer to execute the programs. For example, it is possible to record programs in a recording medium in advance. Further, it is possible to install the programs from the recording medium, as well as to receive programs via a network such as an local area network (LAN) or Internet, and install the received programs into a recording medium, such as a hard disc, incorporated in the computer.

The present application contains subject matter related to that disclosed in Japanese Priority Patent Application JP 2008-271613 filed in the Japan Patent Office on Oct. 22, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A data communication apparatus comprising:
   a band-elimination filter configured to perform a process of reducing a specific frequency component included in transmission data;
   a packet producer configured to produce packet data including therein data outputted from the band-elimination filter; and
   an antenna configured to output the packet data produced by the packet producer;
   wherein the band-elimination filter is a filter configured to reduce a frequency component corresponding to the reciprocal of a packet transmission cycle inherent in the packet data.

2. The data communication apparatus according to claim 1, wherein the packet producer is configured to produce packet data which includes data outputted from the band-elimination filter and pieces of synchronization data which are allocated at intervals of a constant period in the data outputted from the band-elimination filter, and
   wherein the band-elimination filter is a filter configured to reduce a frequency component corresponding to the reciprocal of a transmission cycle of the packet data, which is determined by the constant period provided between any two successive pieces of synchronization data.

3. The data communication apparatus according to claim 1, wherein the transmission data is data resulting from analog-to-digital conversion of voice data inputted from a microphone, and
   wherein the band-elimination filter is a filter configured to reduce a frequency component corresponding to the reciprocal of a packet transmission cycle inherent in packet data having data resulting from analog-to-digital conversion of the voice data and pieces of synchronization data.

4. The data communication apparatus according to claim 1, wherein the packet producer is configured to produce packet data so that the packet data has a plurality of different packet transmission cycles, and
   wherein the band-elimination filter is configured so as to make it possible to reduce a plurality of frequency components corresponding to the reciprocals of the plurality of different packet transmission cycles of the packet data produced by the packet producer, respectively.

5. The data communication apparatus according to claim 4, wherein the band-elimination filter is configured so as to make it possible to reduce the plurality of different frequency components by setting different coefficients thereof.

6. The data communication apparatus according to claim 5, further comprising:

a memory configured to store a coefficient table therein which includes sets of different coefficients to be set to the band-elimination filter; and a coefficient switching controller configured to, in accordance with a transmission cycle of packet data produced by the packet producer, select a coefficient set from the coefficient table, which is appropriate for reduction of a frequency component corresponding to the reciprocal of a transmission cycle of the packet data, and thereby, change a characteristic of the band-elimination filter to an appropriate characteristic.

7. The data communication apparatus according to claim 1, wherein the band-elimination filter is configured to be an infinite impulse response (IIR) filter.

8. The data communication apparatus according to claim 1, wherein the packet producer and the band-elimination filter are configured to be supplied with a clock signal from the same clock supplier, and perform processes in accordance with processing timings determined on the basis of the clock signal, respectively.

9. The data communication apparatus according to claim 1, further comprising:

a digital modulator configured to perform a process of digital modulation of the packet data produced by the packet producer; and a high-frequency amplifier configured to superimpose data outputted from the digital modulator on a carrier wave, and output the resultant signal via the antenna.

10. A communication data control method for performing control of transmission data in a digital communication apparatus, the communication data control method comprising the steps of:

band-elimination filtering in which a band-elimination filter performs a process of reducing a specific frequency component included in transmission data;

packet production in which a packet producer produces packet data including data outputted from the band-elimination filter; and data outputting in which the packet data produced by the packet producer is outputted via an antenna;

wherein, in the band-elimination filtering, a filtering process is performed so that a frequency component corresponding to the reciprocal of a packet transmission cycle inherent in the packet data is reduced.

* * * * *